United States Patent
Russell et al.

(10) Patent No.: US 6,866,240 B2
(45) Date of Patent: Mar. 15, 2005

(54) 16-CAVITY MOLD CLAMP FIXTURE

(75) Inventors: Todd A. Russell, Lawrenceville, GA (US); Alan Conley, Lawrenceville, GA (US)

(73) Assignee: Novartis AG, Basel (CH)

( * ) Notice: Subject to any disclaimer, the term of this patent is extended or adjusted under 35 U.S.C. 154(b) by 465 days.

(21) Appl. No.: 10/106,751

(22) Filed: Mar. 26, 2002

(65) Prior Publication Data

US 2002/0140117 A1 Oct. 3, 2002

Related U.S. Application Data

(60) Provisional application No. 60/279,085, filed on Mar. 27, 2001, and provisional application No. 60/334,854, filed on Oct. 31, 2001.

(51) Int. Cl.$^7$ .............................................. B29D 11/00
(52) U.S. Cl. ................. 249/120; 425/174.4; 425/451.9; 425/808
(58) Field of Search ....................... 249/120; 425/174.4, 425/451.9, 808; 264/1.36

(56) References Cited

U.S. PATENT DOCUMENTS

| | | | |
|---|---|---|---|
| 4,402,659 A | * 9/1983 | Greenbaum | 425/233 |
| 4,495,313 A | 1/1985 | Larsen | 523/106 |
| 4,565,348 A | 1/1986 | Larsen | 248/122 |
| 4,640,489 A | 2/1987 | Larsen | 249/122 |
| 5,271,875 A | 12/1993 | Appleton et al. | 264/2.3 |
| 5,466,147 A | 11/1995 | Appleton et al. | 425/412 |
| 5,938,988 A | 8/1999 | Lust et al. | 264/2.5 |
| 6,511,311 B1 | * 1/2003 | Popps | 425/451.9 |
| 6,669,460 B1 | * 12/2003 | Tai et al. | 425/193 |

FOREIGN PATENT DOCUMENTS

WO    WO 00/18567    4/2000

* cited by examiner

*Primary Examiner*—James P. Mackey
*Assistant Examiner*—Donald Heckenberg
(74) *Attorney, Agent, or Firm*—Karen A. Borrelli; Robert Gorman; R. Scott Meece

(57) ABSTRACT

A mold assembly for producing a plurality of contact lenses includes a front curve fixture assembly, a base curve fixture assembly and a plurality of mold cavities. The plurality of mold cavities are defined by a surface on either the front or the base curve fixture assembly and is disposed in a zig-zag manner relative to each other. Each of the plurality of mold cavities includes a retention edge for complimentary engagement with a mold. The retention edge of a first subset of the plurality of mold cavities is spaced apart from a selected fixture mating surface at a first distance and the retention edge of a second subset of the plurality of mold cavities being spaced apart from the selected fixture mating surface at a different second distance so that a plurality of molds may be placed in adjacent cavities so as to overlap the mold flanges.

14 Claims, 3 Drawing Sheets

16-CAVITY MOLD CLAMP FIXTURE

CROSS REFERENCE TO A PROVISIONAL APPLICATION

This patent application claims priority on Provisional Application Ser. Nos. 60/279,085, filed on Mar. 27, 2001, and 60/334,854, filed Oct. 31, 2001, the entirety of which are hereby incorporated by reference.

BACKGROUND OF THE INVENTION

1. Field of the Invention

The present invention relates to mold clamp fixtures and more specifically to a mold fixture used to clamp together male/female mold assemblies in the production of contact lenses.

2. Description of the Prior Art

Contact lenses are produced using lens molds. The lens molds typically have a male and female portion which mate together to form a cavity in the shape of the desired lens. Prior to mating the male and female lens molds together, the female mold is filled with a liquid lens material. The male mold is then placed over the female mold and the lens material is squeezed into the desired lens shape. The liquid lens material is then hardened into a lens by the introduction of ultraviolet light into the mold cavity. The ultraviolet light impinges the outside of the mold and passes into the internal cavity due to the transparent properties of the mold material.

The male and female lens molds are clamped together within a pair of mold clamp fixtures. The female lens molds are placed within cavities in a first fixture. The male lens molds are placed within cavities in a second fixture. The fixtures support and align the mating lens molds. When the two fixtures are mated, the male and female lens molds are clamped together in the proper alignment. Each fixture has multiple cavities to accept the male and female lens molds, and hence multiple lenses are produced within the fixtures during each clamping cycle. The number of cavities within each fixture is limited by the physical size of the lens molds and the structural considerations of the fixture. The fixture cavities may be positioned adjacent to one another within the fixture body with the limitation that the lens molds must not interfere with one another during the molding cycle.

During the molding cycle, the mold clamp fixtures must also provide a controlled clamping load to the male and female molds. A sealing lip is used about the periphery of the lens mold to provide a liquid seal when the two molds are clamped together. The fixtures must apply a clamping force to the lens molds in the area of the sealing lip without any appreciable deflection of the assembly. Any deflections of the clamp fixtures may result in deflections in the lens molds and result in imperfections in the finished contact lenses.

Therefore, there is a need for a mold clam fixture accommodating a greater number of contact lens molds within a given size fixture.

SUMMARY OF THE INVENTION

The disadvantages of the prior art are overcome by the present invention which, in one aspect, is a mold assembly for producing a plurality of contact lenses. Each contact lens is formed within a mold having a lens molding surface and a flange portion extending radially from the lens molding surface. The mold assembly includes a front curve fixture assembly and a base curve fixture assembly. Each fixture assembly has an interior surface which defines a plurality of mold cavities. Each fixture assembly also has a mating surface where the two assemblies contact one another when clamped together.

The plurality of mold cavities of the front curve and base curve fixture are spaced across the fixture faces in a zig-zag pattern relative to each other. Each mold cavity has a retention edge at the bottom of the cavity for complimentary engagement with a lens mold. A first subset of the plurality of mold cavities are spaced apart from a selected fixture mating surface at a first distance, the retention edge of a second subset of the plurality of mold cavities are spaced apart from the selected fixture mating surface at a second distance. The first distance is different from the second distance so that a plurality of molds may be placed in adjacent cavities so as to overlap the mold flanges. Hence, the molds may be positioned closer together in the fixture assembly than would be possible if the retention edges were all at the same distance from the mating surface.

In another aspect, the base curve fixture includes a retractable load element and a spring element. The load element includes the retention edge of the base curve mold cavity and is urged to an extended position by the spring element. The load element applies a clamping force to the lens molds within the base curve fixture via compression of the spring element. A spacer is used to adjust the clamping force exerted by the load element. The load element, spacer, and spring are held in position within the base curve fixture by a retention clip. The spring element includes a wave spring. In another aspect, the spring element may include an air spring.

In yet another aspect of the invention, the base curve fixture defines a passage beneath each of the plurality of mold cavities. The passage extends from the base curve fixture interior surface to an opposing exterior surface of the fixture. Light form an external source may pass through the passage to impinge the lens molds within the fixture cavities. The physical characteristics of the base curve passage internal surfaces, such as the surface finish and color, may be altered to adjust the amount of light passing therethrough. Other physical characteristics of the passage such as the passage internal diameter, passage length and the passage shape may also be altered to adjust the amount of light reaching the lens molds.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
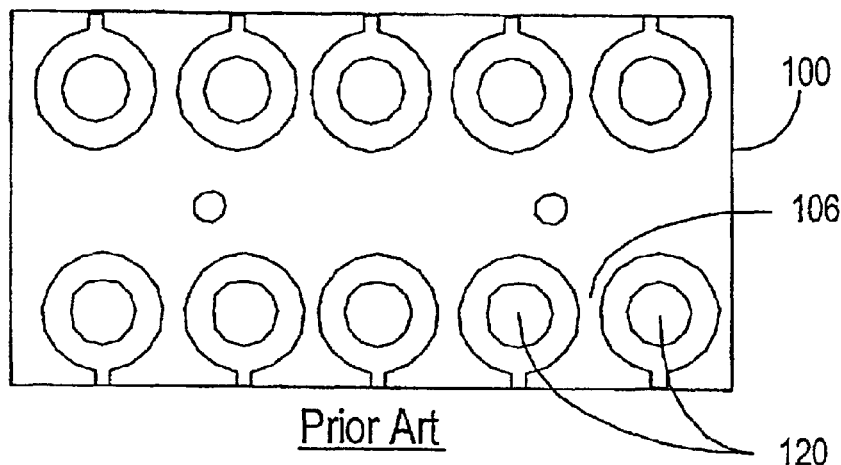
FIG. 1 is a top view of one example of a prior art device.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and on.

One example of a prior art mold clamp fixture for use in the production of contact lenses is shown in FIG. 1. Contact lenses are formed using male and female lens molds which clamped together in the proper alignment using a mold clamp fixture. The fixture body 100 has a plurality of cavities 120 into which female lens molds are placed. The fixture body 100 aligns and retains the mold halves. The female mold halves are then filled with a liquid lens material. A second fixture body containing the mating male mold halves is then clamped into position over the first fixture body 100 with the mold cavities 120 in alignment. In this manner, the male and female lens molds are clamped in proper alignment to one another during the curing of the liquid lens material via exposure to ultraviolet light.

In the prior art embodiment shown in FIG. 1, a total of ten mold cavities 120 are evenly spaced across the face of the fixture body 100. The mold cavity spacing accommodates a stiffening rib 106 of fixture material between each mold cavity 120. The stiffening rib 106 aids in minimizing the deflection of the molding fixture due to the clamping forces exerted during the molding process. A deflection of the molding fixture during the molding process may result in deflections of the male/female lens molds, which results in imperfections in the geometry of the contact lenses produced, However, the use of stiffening ribs 106 results in a loss of surface area on the mold face for the inclusion of additional mold cavities 120.

Figure 2A:
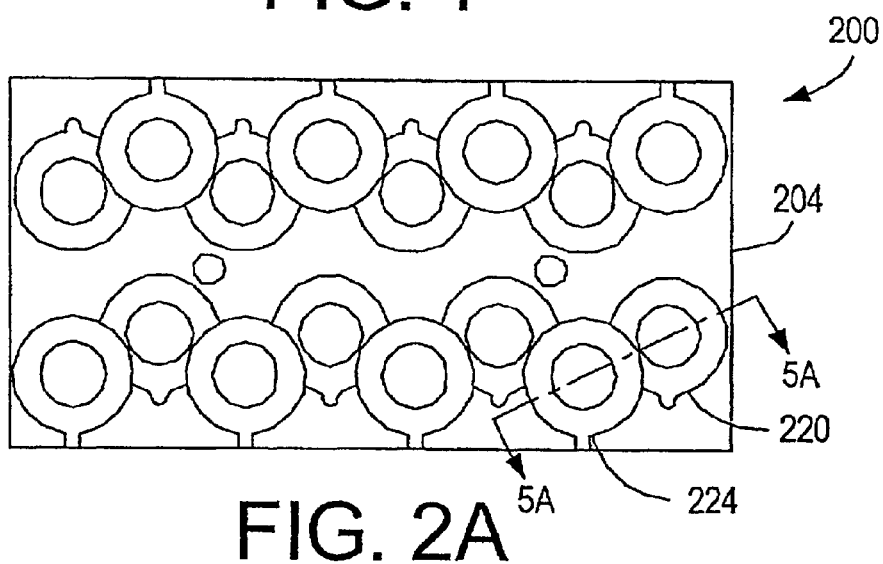
FIG. 2A is a top view of a front curve fixture assembly.
Figure 2B:
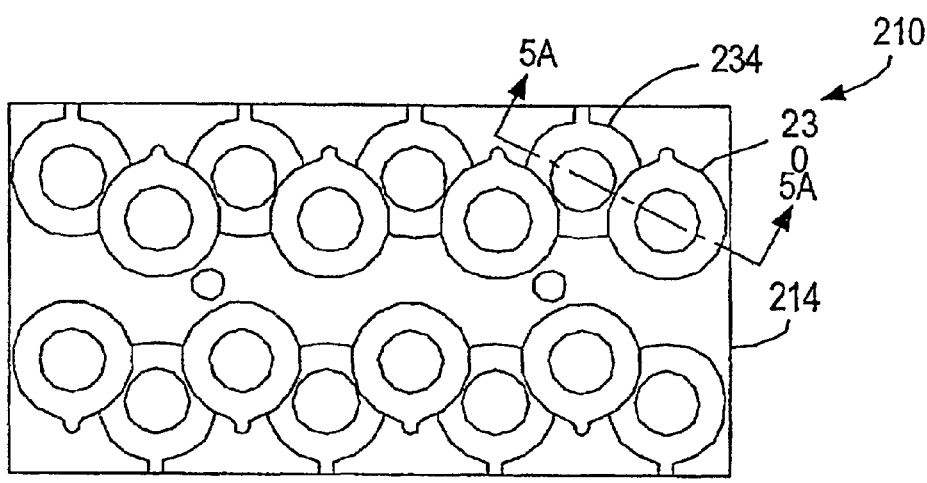
FIG. 2B is a top view of a base curve fixture assembly.
Figure 3:
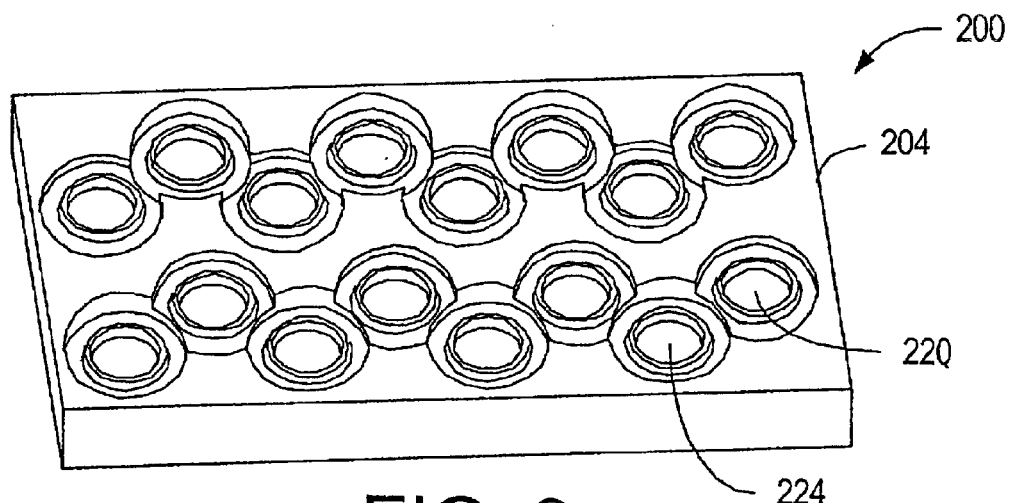
FIG. 3 is an isometric view of a front curve fixture assembly according to the embodiment shown in FIG. 2A.

As shown in FIGS. 2A and 2B, one illustrative embodiment of a mold clamp fixture, according to the invention, includes two distinct mating halves, a front curve (FC) fixture assembly 200 shown in FIG. 2A and a base curve (BC) fixture assembly 210 shown in FIG. 2B. The FC fixture assembly 200 has 16 cavities recessed into the FC fixture body 204. The FC fixture cavities may be divided into two groups of 8 cavities each. As further shown in FIG. 3, the first group of 8 cavities 220 are recessed into the FC fixture body 204 to a shallow depth. The second group of 8 cavities 224 are recessed into the FC fixture body 204 to a greater depth and intersect the shallow cavities 220.

The BC fixture assembly 210 also has 16 cavities recessed into the BC fixture body 214 at locations which mirror those of the FC fixture assembly 200. As in the FC fixture assembly 200, the BC fixture cavities may be divided into two groups of 8 cavities each. The first group of 8 cavities 234 are recessed into the FC fixture body 204 to a shallow depth and appear as incomplete circles in FIG. 2B. The second group of 8 cavities 230 are recessed into the FC fixture body 204 to a greater depth and appear as complete circles in FIG. 2B.

Figure 4:
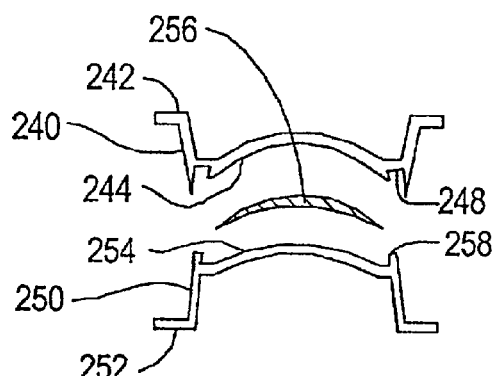
FIG. 4 is cross sectional view of a front curve mold and a base curve mold.

As shown in FIG. 4, the FC mold 240 has a precision surface 244 for forming the contact lens geometry and a mold flange 242 extending radially outward about the periphery of the precision surface 244. Similarly, the BC mold 250 has a precision surface 254 for forming the contact lens geometry and a mold flange 252 extending radially outward about the periphery of the precision surface 254. The BC mold 250 has a lip 258 which engages a recess 248 in the FC mold 240, thus forming a liquid seal as the two molds are clamped together. As the two molds are mated, the liquid lens formulation is formed between the FC mold 240 precision surface 244 and the BC mold 250 precision surface 254. The lens formulation is then hardened by exposure to ultraviolet light to produce the desired contact lens 256.

Figure 5:
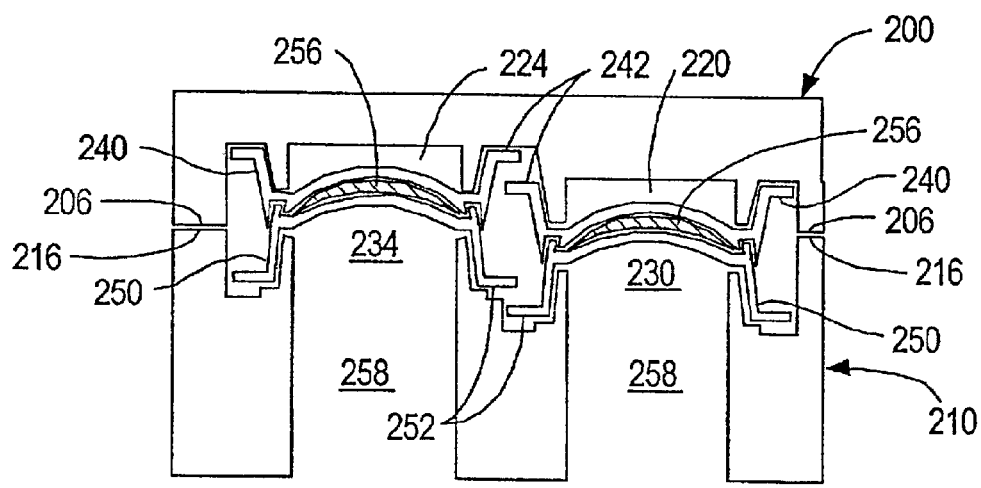
FIG. 5 is a cross sectional view of mated base curve and front curve fixture assemblies according to the embodiment shown in FIGS. 2A and 2B, taken along lines 5A—5A.

As shown in FIG. 5, the FC fixture assembly 200 is mated to the BC fixture assembly 210. Prior to the mating of the fixture assemblies, an FC mold 240 is inserted within each FC fixture cavity 220 and 224 and a BC mold 250 is inserted withing each BC fixture cavity 230 and 234. A liquid lens formulation is deposited within the FC mold 240. The FC fixture assembly 200 and BC fixture assembly 210 are then clamped together. As the fixtures are drawn together, all FC molds 240 mate with the corresponding BC molds 250 and the FC fixture mating surface 206 contacts the BC fixture mating surface 216. The FC fixture cavities 220 align with the BC fixture cavities 230 and the FC fixture cavities 224 align with the BC fixture cavities 234. In this manner, the shallow FC fixture cavities 220 are paired with the deep BC fixture cavities 230, with the resulting space formed between the two cavities sized to provide a clamping force between the mating FC molds 240 and BC molds 250, and the deep FC fixture cavities 224 are paired with the shallow BC fixture cavities 234, with the resulting space again sized to provide a clamping force between the mating FC molds 240 and BC molds 250. Within the BC fixture assembly 210, beneath each BC fixture cavity 230 and 234 are passages 258 through which ultraviolet light from an external source may pass. The ultraviolet light passing through the passages 258, impinges the transparent BC molds 250 and causes the liquid lens formulation contained within the FC molds 240 and BC molds 250 to harden into contact lenses 256. As will be appreciated by those skilled in the art, in a similar design the FC mold may be positioned within a BC fixture cavity, with the mating BC mold positioned within the corresponding FC fixture cavity. In yet another design, the FC and BC molds may alternate orientations between adjacent cavities within the same fixture assembly.

As shown in FIG. 5, the flanges 242, 252 of the two FC molds 240 and the two BC molds 250 are vertically offset from one another as a result of the different depths of the FC cavities 220 and 224, and the different depths of the BC cavities 230 and 234. This vertical offset of the mold flanges 242 and 252 allows the adjacent FC cavities 220 and 224 and the adjacent BC cavities 230, 234 to be positioned closer together within the FC and BC fixtures 200 and 210. This "tiered" arrangement allows the maximum possible overlap between adjacent mold pairs and results in a greater number of mold cavities incorporated within a given size fixture assembly. As a result, the number of contact lenses produced from a given size fixture assembly per each molding cycle is increased. For the fixture size of the current design, 16 lenses are produced per molding cycle verses 10 lenses in the prior art design shown in FIG. 1.

Figure 6A:
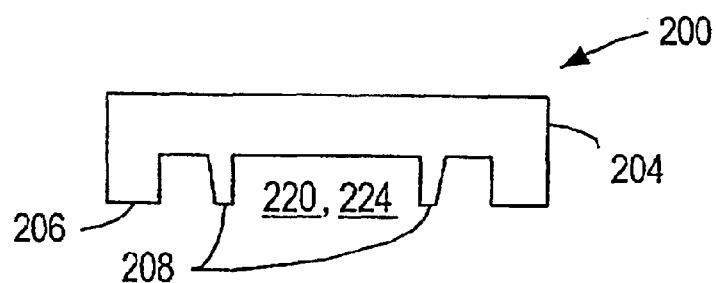
FIG. 6A is a cross sectional view of a front curve mold fixture.
Figure 6B:
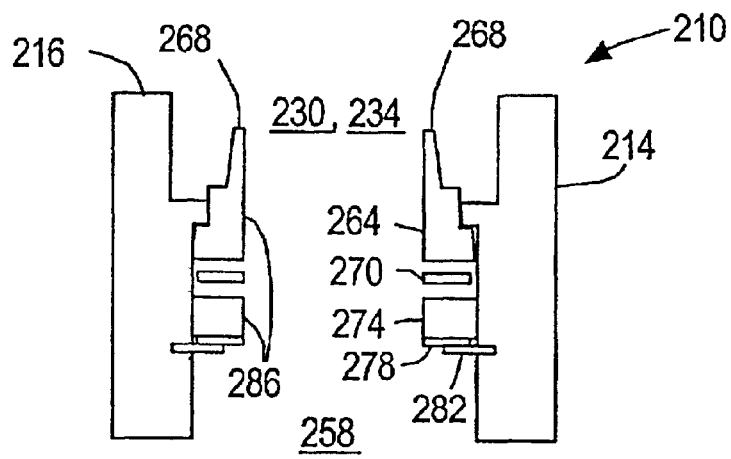
FIG. 6B is a cross sectional view of a base curve mold fixture.

As shown in FIG. 6A, the FC fixture assembly 200 includes an FC base 204 with the lower surface thereof forming the FC fixture mating surface 206. The FC fixture cavities 220, 224 are formed within the FC base 204. Within each FC cavity 220, 224 a circular raised portion is formed which terminates in retention edge 208. As shown in FIG. 6B, the BC fixture assembly includes a BC base 214, with the upper surface thereof forming BC fixture mating surface 216. The BC fixture cavities 230 and 234 are formed within the BC base 214. The passage 258 allows ultraviolet light from an external source to be directed into each BC fixture cavity 230 and 234.

The BC fixture assembly 210 incorporates 16 individually spring-loaded elements that, when compressed, apply a controlled clamping force to their respective BC mold halves 250 A load element 264 is positioned beneath each BC fixture cavity 230 and 234. On the upper portion of each load element 264, a retention edge 268 is formed. The load element 264 is urged upward by a wave spring 270. The wave spring 270 is held in position by spacer 274, precision shim 278, and retention clip 282. The amount of force applied by the load element 264 may be increased (decreased) by adding (removing) precision shims 278 to the assembly. In this manner, the assembly can be adjusted to accommodate mold assemblies of varying designs requiring varying amounts of loading. Interchangeable spacers 274 are included within each cavity to accommodate varying assembled mold "stack" heights. The spacers 274 allow the same fixture to be used with a variety of different lens mold designs. The retention clip 282 is in the form of an internal cir-clip and engages a recess 284 in BC base 214. As may be appreciated by those skilled in the art, the compressive force generated by the wave spring 270 may be accomplished by a variety of other means such as air springs, coil springs, and the like. As may also be appreciated by those skilled in the art, a variety of other means may be used to secure to secure the load element 264 and wave spring 270 assembly in place such as threaded connections, clips, or the like.

Figure 7:
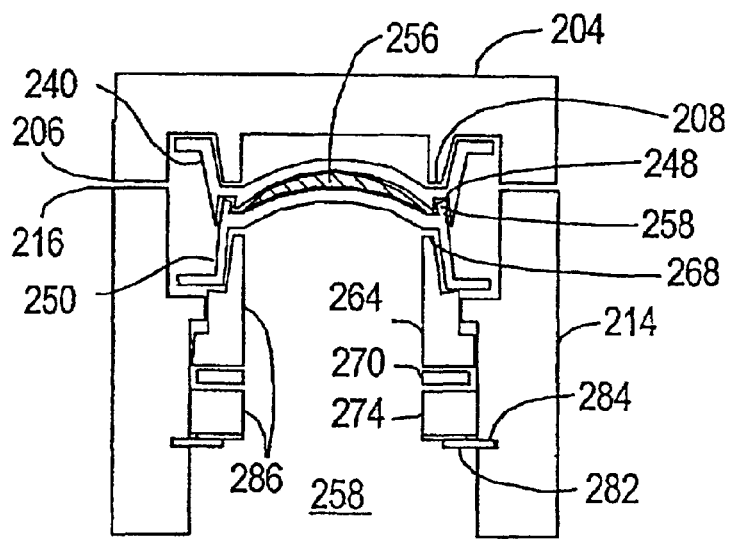
FIG. 7 is a cross sectional view of mated base curve and front curve fixture assemblies according to the embodiment shown in FIGS. 6A and 6B.

As shown in FIG. 7 the BC load elements 264 have been designed so as to apply force at a location on the BC mold 250 corresponding to the contact point of the FC mold recess 248 with the BC mold lip 258. As the molding fixtures are mated, the BC/FC mold halves 240 and 250 are clamped between the BC load element 264 retention edge 268 and the FC base 204 retention edge 208. As the fixtures are drawn together, the wave spring 270 is compressed until the mating surface 206 contacts the BC mating surface 216. The clamping force generated is applied across the contact point of the FC mold recess 248 and the BC mold lip 258. The loading is required to ensure that the mating surfaces of the FC/BC mold halves 240 and 250 are in intimate contact during the UV curing operation. This arrangement has been found to reduce the amount of mold flexure normally associated with more conventional "offset" loading configurations. Reduced mold flexure, in turn, improves the accuracy of the resulting contact lens 256 since the cavity formed by the FC/BC mold assembly more closely matches the intended final lens geometry.

The load elements 264, springs 270, spacers 274, and precision shim 278 are also designed so as to permit UV light to be transmitted through the center of each via the passage 258, through the substantially transparent BC mold 250, and, in turn, into the liquid lens formulation contained within the mold assembly. It has been found that the intensity of the UV light impinging upon the BC mold 250 can be varied by altering a number of physical characteristics of the load elements 264 and spacers 274 such as the internal diameter, length, shape, surface finish, and color. A smooth surface finish on the internal surfaces 286 of the load element 264 and spacer 274, for example, provides greater reflectivity, thereby increasing UV intensity as measured in the vicinity of the mold assembly. Conversely, black-colored internal surfaces 286 significantly reduces reflectivity, and correspondingly reduces UV intensity. By adjusting these parameters as listed above, either collectively or individually, UV intensity levels may be adjusted independent of the output of the light source to ensure a preferred intensity that meets the requirements of the curing process of a specific set of lenses.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A mold assembly for producing a plurality of contact lenses, each contact lens being formed in a mold, each mold having a flange portion extending radially from a lens molding surface, the mold assembly comprising:
   a. a front curve fixture assembly comprising a front curve fixture interior surface and a front curve fixture mating surface;
   b. a base curve fixture assembly comprising a base curve fixture interior surface and a base curve fixture mating surface; and
   c. a plurality of mold cavities defined by a selected one of the front curve fixture interior surface or the base curve fixture interior surface, each of the plurality of mold cavities disposed in a zig-zag manner relative to each other, with each of the plurality of mold cavities including a retention edge for complimentary engagement with a mold, the retention edge of a first subset of the plurality of mold cavities being spaced apart from a selected fixture mating surface at a first distance, the retention edge of a second subset of the plurality of mold cavities being spaced apart from the selected fixture mating surface at a second distance, the first distance being different from the second distance so that a plurality of molds may be placed in adjacent cavities so as to overlap the mold flanges.

2. The mold assembly of claim 1, wherein the base curve fixture comprises a retractable load element and a spring element, the load element comprising the retention edge of the base curve mold cavity, the load element being urged to an extended position by the spring element.

3. The mold assembly of claim 2, wherein the spring element comprises a wave spring.

4. The mold assembly of claim 2, wherein the spring element comprises an air spring.

5. The mold assembly of claim 2, wherein the base curve fixture also comprises a spacer.

6. The mold assembly of claim 1, wherein the base curve fixture defines a passage beneath each of the plurality of mold cavities, the passage passing from the base curve fixture interior surface to an opposing exterior surface, the passage suitable for light to pass therethrough.

7. The mold assembly of claim 6, wherein the surface finish of the passage internal surfaces may be selected to vary the amount of light passing therethrough.

8. A mold assembly for producing contact lenses, the contact lens being formed between a front curve mold and a base curve mold, each front curve mold and base curve mold having a flange portion extending radially from the lens molding surface, the mold assembly comprising:
   a. a front curve fixture assembly comprising a front curve interior surface and a front curve fixture mating surface;
   b. a base curve fixture assembly comprising a base curve interior surface and a base curve fixture mating surface;

c. a plurality of front curve mold cavities defined by the front curve fixture interior surface, each of the plurality of mold cavities disposed in a zig-zag manner relative to each other, with each of the plurality of mold cavities including a retention edge for complimentary engagement with the front curve mold, the retention edge of a first subset of the plurality of mold cavities being spaced apart from the front curve fixture mating surface at a first distance, the retention edge of a second subset of the plurality of mold cavities being spaced apart from the front curve fixture mating surface at a second distance, the first distance being different from the second distance so that the front curve molds may be placed in adjacent cavities so as to overlap the mold flanges; and d. a complimentary plurality of base curve mold cavities defined by the base curve fixture interior surface, each of the plurality of mold cavities disposed in a zig-zag manner relative to each other, with each of the plurality of mold cavities including a retention edge for complimentary engagement with the base curve mold, the retention edge of a first subset of the plurality of mold cavities being spaced apart from the base curve fixture mating surface at a first distance, the retention edge of a second subset of the plurality of mold cavities being spaced apart from the base curve fixture mating surface at a second distance, the first distance being different from the second distance so that base curve molds may be placed in adjacent cavities so as to overlap the mold flanges.

9. The mold assembly of claim 8, wherein the base curve fixture comprises a retractable load element and a spring element, the load element comprising the retention edge of the base curve mold cavity, the load element being urged to an extended position by the spring element.

10. The mold assembly of claim 9, wherein the spring element comprises a wave spring.

11. The mold assembly of claim 9, wherein the spring element comprises an air spring.

12. The mold assembly of claim 9, wherein the base curve fixture also comprises a spacer.

13. The mold assembly of claim 8, wherein the base curve fixture defines a passage beneath each of the plurality of mold cavities, the passage passing from the base curve interior surface to an opposing exterior surface, the passage suitable for light to pass therethrough.

14. The mold assembly of claim 13, wherein the surface finish of the passage internal surfaces may be selected to vary the amount of light passing therethrough.

* * * * *